INVENTOR
ROBERT B. HARTMAN
BY
ATTORNEY

Aug. 12, 1969   R. B. HARTMAN   3,460,572
FLUIDIC SYSTEM
Filed Dec. 21, 1966   3 Sheets-Sheet 2

INVENTOR
ROBERT B. HARTMAN
BY
D. Verner Smythe
ATTORNEY

Aug. 12, 1969  R. B. HARTMAN  3,460,572
FLUIDIC SYSTEM
Filed Dec. 21, 1966  3 Sheets-Sheet 3
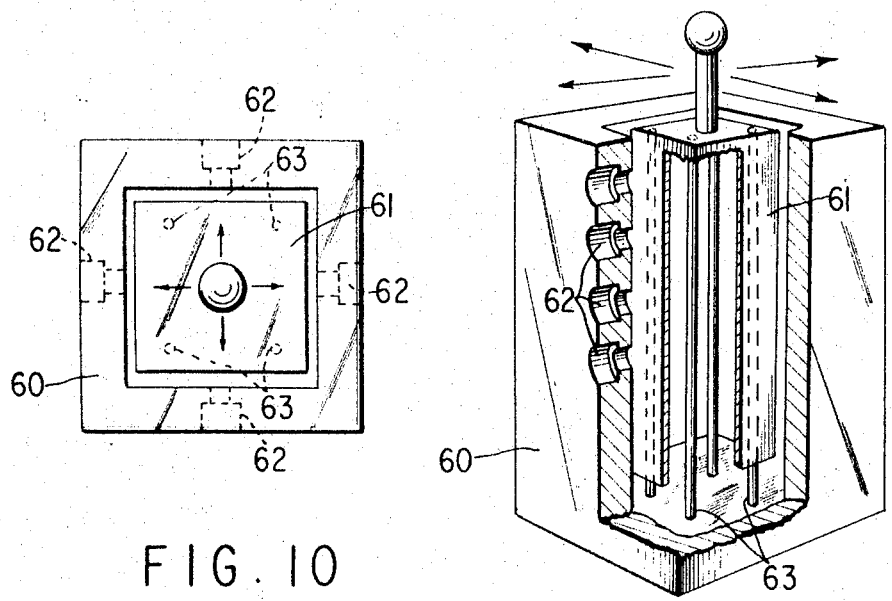
FIG. 10
FIG. 9
FIG. 11
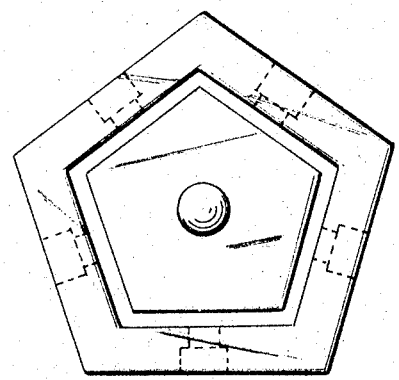
INVENTOR
ROBERT B. HARTMAN
BY
D. Verner Smythe
ATTORNEY United States Patent Office 3,460,572
Patented Aug. 12, 1969

3,460,572
FLUIDIC SYSTEM
Robert B. Hartman, Bridgeport, Conn., assignor to Remington Arms Company Inc., Bridgeport, Conn., a corporation of Delaware
Filed Dec. 21, 1966, Ser. No. 603,533
Int. Cl. F16k 11/02, 31/56
U.S. Cl. 137—625.48                                13 Claims

ABSTRACT OF THE DISCLOSURE

A fluidic valve arrangement including a valve body with fluid pressure ports, and a movable valve unit integrally and flexibly connected to the valve body at spaced points to provide a parallelogram-like arrangement. The value unit is movable rectilinearly for simultaneously opening and closing all of the ports.

---

This invention relates to a valve arrangement for substantially simultaneously closing or opening a plurality of fluid passages and is particularly suited for use in conjunction with fluidic control devices and components thereof. The valve includes a valve body and a movable element carried by a parallelogram-like arrangement.

It has been found in conjunction with fluidic control devices that it is necessary in some instances to close or open a plurality of passages simultaneously without any chance of a sequential closing or opening operation taking place. It is also desirable to have a relatively inexpensive simple switching arrangement for simultaneously opening or closing a plurality of fluid passages.

One of the objects of the invention is to provide a valve or switching arrangement which will close or open two or more passages substantially at the same time.

Another of the objects of the invention is to provide a valve or switching arrangement which will be relatively simple in construction and will be inexpensive to produce.

In one aspect of the invention, a valve body is provided having a plurality of passages or ports connected to sources of fluid pressure, there being a planar or suitably shaped seat surface having said port openings therein. A complementaary valve surface is mounted on said valve body so as to have rectilinear movement upon actuation relative to said seat so that all of said ports will be opened or closed at the same time. Preferably, the movable element is suspended on two flexible leaves or elements which are integral with the body and movable element to provide a parallelogram-like arrangement. The term "parallelogram means" is intended to include such arrangements. In a preferred form, the parallelogram-like arrangement comprises at least a pair of parallel single leaf spring elements rigidly secured at one end to the fixed member and at the other end to the movable member to constrain the movable member to movement along such a line that is always parallel to its rest position. The leaves can be molded integral with the body or can be inserted in such as manner as to be integral in effect.

In another aspect of the invention, the surfaces can be arranged to provide a closing or an opening of the ports upon movement of the movable part. Also, there can be a plurality of rows of ports at right angles or in various angular relationships, the movable element then being supported on rods so as to provide rectilinear and parallel movement.

The above, other objects, advantages and features or the invention will become apparent from the following description and accompanying drawings which are merely exemplary.

Figure 1:
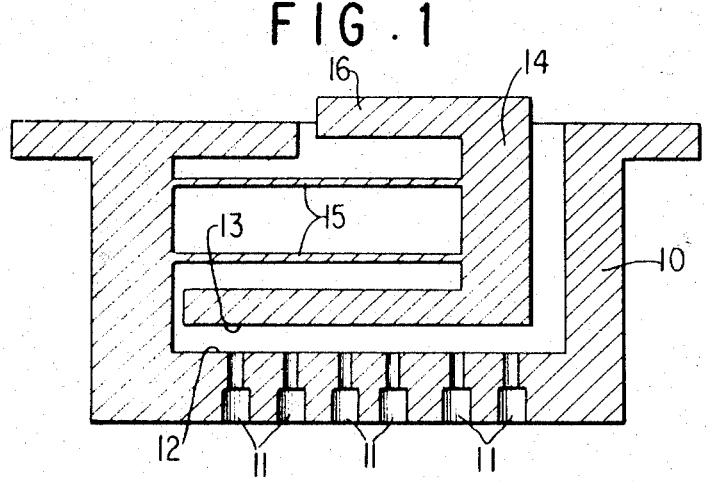
Figure 2:
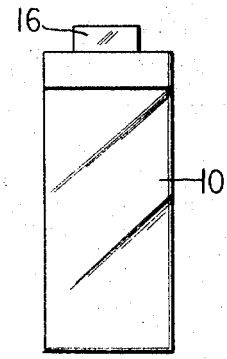
Figure 3:
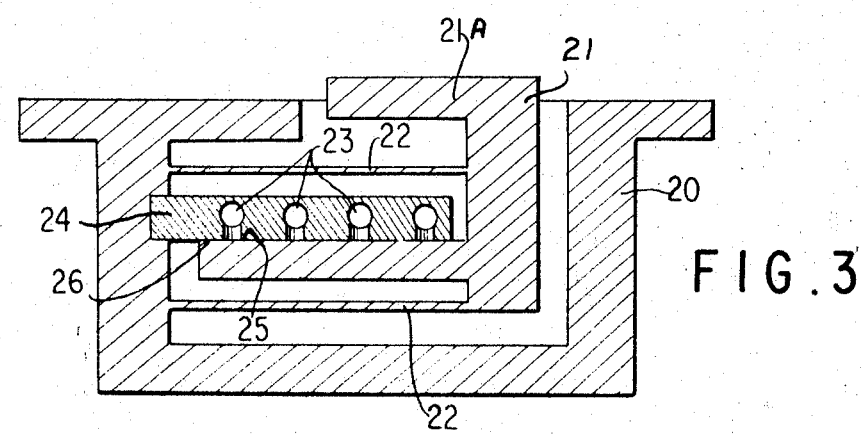
Figure 4:
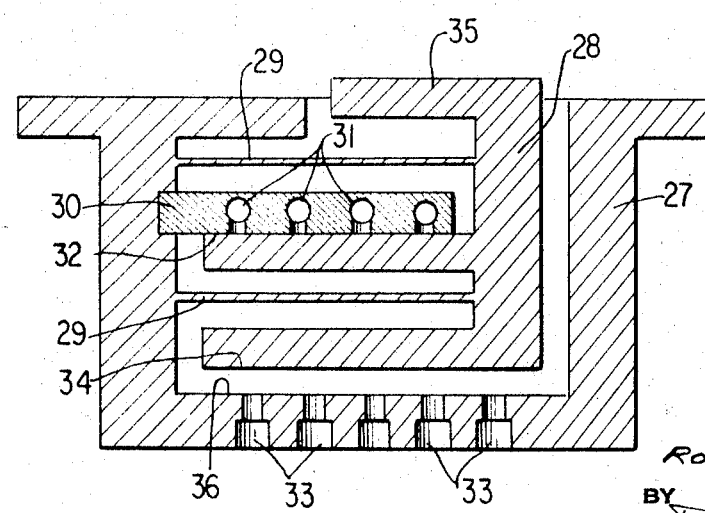
Figure 5:
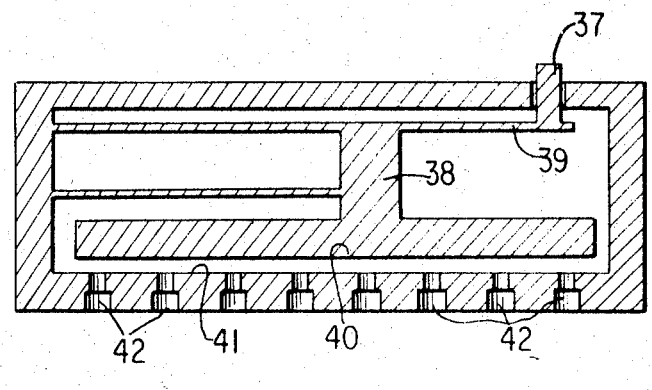
Figure 6:
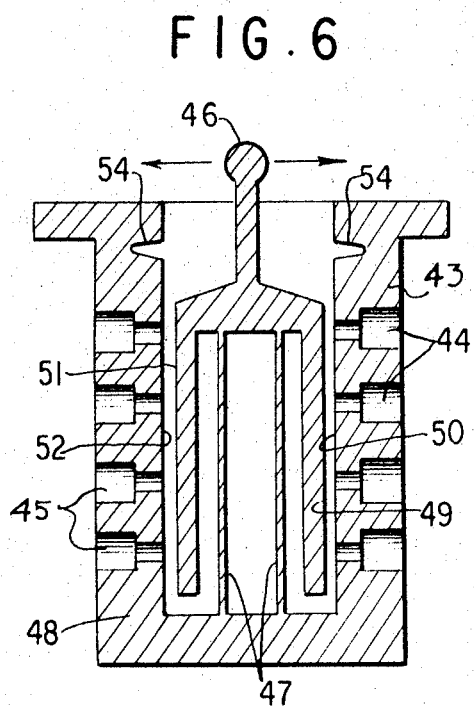
Figure 7:
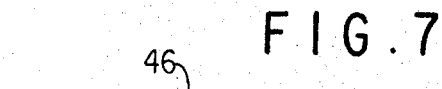
Figure 8:
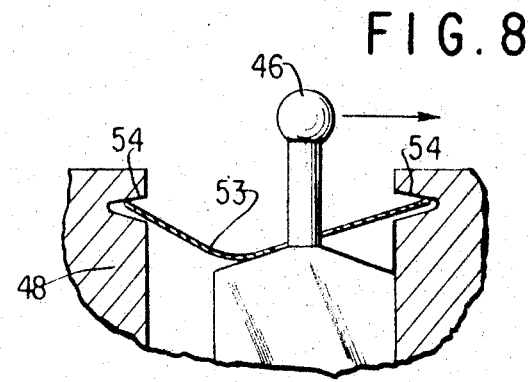

In the drawings:
FIG. 1 is a sectional view of one form of the invention;
FIG. 2 is an end view looking from the right of FIG. 1;
FIG. 3 is a sectional view of another form of the invention;
FIG. 4 is a sectional view of still another embodiment;
FIG. 5 is a sectional view of a further embodiment;
FIG. 6 is another embodiment of the invention;
FIGS. 7 and 8 are fragmentary enlarged views of a spring arrangement for FIG. 6;
FIG. 9 is a schematic view of still another form;
FIG. 10 is a top view of FIG. 9; and
FIG. 11 is a top view of another form.

Referring to FIG. 1, valve body 10 may have a plurality of passages 11 therein. The body 10 has a planar surface 12 which serves as a valve seat means relative to passages 11. Planar surface 13 is located on the movable valve element 14. Movable valve element 14 basically comprises a rigid element or component supported by substantially parallel flexible or resilient members 15, 15 which may be integral with valve operating member 14 and with valve body 10. Operator or button 16 extends outwardly of body 10 so that it can be manipulated as desired to close the valve ports or passages 11. The flexible or resilient members could, of course, be inserted in slots (not shown) and integrally joined with body 10 and element 14. When resilient material is used, no additional restoring spring force is needed.

Because of the parallelogram-like action of leaf members 15 when button 16 is pressed, operating button 16 moves in a plane rectilinear movement so that the planar surface 13 will contact surface 12 along substantially its whole length so as to close all of the passages 11 simultaneously.

Merely as an example, valve parts may be molded or formed from any suitable plastic such as one sold under the trademark "Lucite," the trademark of E. I. du Pont de Nemours for its brand of methyl methacrylate. Other suitable plastic materials can be employed. Members 15, 15 must be sufficiently thin and resilient so that they will provide the necessary properties required for recovery of movable element 14 upon release of button 16.

Merely by way of example, valve body 10 may be 1½ inches long by ½ inch wide by ¾ inch deep so that it will be suitable for use in various fluidic control systems and circuits. One such use would be in conjunction with keyboard operated mechanisms or systems.

FIG. 3 is an example of a valve arrangement wherein the valve passages are normally closed. Valve body 20 has a movable valve member 21, said movable member 21 having flexible fingers or leaves 22, 22 integral with body 20. The ports 23 are in insert 24. Such is necessary for assembly purposes since in the form shown the device could not be molded in a single piece.

Planar surface 25 of movable member 21 cooperates with planar surface 26 of insert 24 and operates in a manner similar to that illustrated in FIG. 1, so that when button 21A is pressed, all of the valve ports will be opened simultaneously and when released, the ports will be closed simultaneously.

The elastic properties of leaves 22 will hold the valve in a closed position as long as the pressure confined within ports 23 does not exceed the closing force exercised by the two leaves 22, 22. Leaves 22 may be formed or constructed so as to have an upward bias or prestress in order to insure closing force of the movable member. It can be seen that as button 21A is pressed downwardly, there will be rectilinear movement of the movable part 21 so that the planar surfaces 25 and 26 will remain parallel relative to each other and will provide simultaneous opening and closing of the ports.

A combintaion switch arrangement is seen in FIG. 4 wherein one set of ports is open and the other set of ports is closed. Body 27 has a movable member 28 supported on flexible leaves 29, 29, the leaves being integral with body 27 as in the previous figures. Insert 30 has ports 31 therein which are closed by planar surface 32. Planar surface 34 cooperates with planar seat surface 36 to close off the ports or passages simultaneously when the button 35 is actuated, such movement of member 28 opening ports 31.

FIG. 5 shows an arrangement similar to FIG. 1 with the exception that pushbutton 37 is connected to movable element 38 by an elastic or flexible member 39 which permits overtravel of pushbutton 37 without damage or function change within the switch. When movable member 38 is stopped by contact with planar surface 41, further depression of button 37 will merely flex element 39. Planar surface 40 cooperates with valve seat planar surface 41 to close off passage 42 in a manner similar to that described for the previous arrangement.

FIG. 6 illustrates a fluidic valve arrangement which can close passages selectively on either side of the valve body thereof. Body 43 has passages 44 on one side and passages 45 on the other side which can be selectively closed with the switch. When movable element 46 is in a neutral or central position, it does not close any of the passages. The movable element 46 is supported by flexible leaves 47 which may be integral with body 48. Planar surface 49 will cooperate with planar surface 50 to close passages 44 when the switch element is moved to the right (FIG. 6). Similarly, if the switch element 46 is moved to the left, planar surface 51 will cooperate with planar surface 52 to close passages 45.

Referring to FIGS. 7 and 8, a spring element 53 can be located in slots 54 at the top of the valve body 48 to provide a snap action of the device of FIG. 6 so as to retain the switch in either of two stable positions. This is in contrast to the momentary contact arrangement shown in FIG. 6. FIG. 7 shows the switch in a lefthand position and FIG. 8 shows the switch in the righthand position.

Another example is that shown in FIGS. 9 and 10 wherein an arrangement is shown similar to FIG. 6 with the exception that it is operable in at least two angularly related directions. In this arrangement, movable valve element or shell 61 can have planar surfaces on each of the four sides for cooperation with ports 62 arranged in each of the sides. The movable element 61 which is in the form of a shell has rods or bars 63 adjacent each of the corners thereof, said rods being rigidly attached to the top face of the shell and to the case or body 60, the rods serving the same purpose as the leaves of the prior described valves. The rods must be of sufficient resiliency to permit movement as desired of the movable shell 61. The movable member can be moved in other directions than indicated by the arrows. For example, if moved toward the corners, pairs of columns or sets of ports will be closed.

The number of rods must exceed two for two-dimensional motion but can be any number so long as they do not themselves provide a rigid column. Three rods would work as well as the illustrated four.

The movable shell 61 and mating surface of the body 60 could be any desired shape with rows of ports as desired therein such as seen in FIG. 11 which shows an arrangement similar to FIGS. 9 and 10 but with the casing and valve parts pentagonal.

It is preferably that the leaves or rods be integral with the body or integrally attached as described, but if a bias spring is used, the leaves or rods could be pivotally mounted at their ends instead of being integrally fastened to the body and movable members.

What is claimed is:

1. In a valve for fluidic control apparatus having a plurality of passages to be controlled, the combination including valve body means having at least two fluid passages therein, said body means having spaced side walls, parallelogram valve means in and flexibly connected to one of the walls of said body means and permitting rectilinear movement of said valve means in a path parallel to said one said walls, and passage closing means attached to said parallelogram means engageable with said passage means for closing and opening the same substantially simultaneously upon rectilinear movement of said parallelogram means relative to said passage means.

2. A valve according to claim 1 wherein the openings from the passage means are in a plane and the passage closing means is in a plane, said planes moving parallel relative to each other.

3. A valve according to claim 1 wherein the parallelogram means includes a pair of parallel leaves attached at one of the ends thereof to the valve body means and at the other ends thereof to a rectilinearly movable means carrying the passage closing means.

4. A valve according to claim 3 wherein the passage means are in a portion of said body means extending between said leaves so that the passage means are normally in closed position.

5. A valve according to claim 3 wherein one set of passage means is in the valve body means outside of said leaves and there is another set of passage means in a portion of said body means extending between said leaves, said leaves being biased so that one set of passage means normally is open and the other set of passage means normally is closed.

6. A valve according to claim 1 wherein the operator for the parallelogram means includes a flexible leaf providing overtravel of an operator therefor after the parts have reached a passage closing relationship.

7. A valve according to claim 1 wherein there are sets of passage means in the walls of said valve body means in spaced rows and said parallelogram is movable toward any of the rows.

8. A valve according to claim 7 wherein the parallelogram means is supported on a plurality of bars so that the passage closing means can be moved toward the selected row.

9. A valve according to claim 1 wherein there is another set of at least two fluid passages and there is another passage closing means on said parallelogram for opening and closing said another set of passages substantially simultaneously, said another set of fluid passages being normally closed while said first mentioned fluid passages are normally open, movement of said parallelogram changing the condition of said passages.

10. A valve according to claim 7 including spring means attached to said parallelogram maintaining said passage closing means in one of the positions to which it has been moved.

11. A valve according to claim 10 wherein the spring means is a member with its extremities carried by notches in walls of said valve body, the spring being multi-stable in configuration in conjunction with the operating lever to provide a latching action in the chosen position.

12. A valve according to claim 3 wherein the leaves are of a material having sufficient resiliency to maintain said passage closing means in a selected relationship with its related fluid passages.

13. A valve according to claim 11 wherein the spring means is a member with its extremities carried by notches in walls of said valve body, the spring means length being such that the spring will be multi-stable in conjunction with the operating lever to provide a latching action in the chosen position.

References Cited

UNITED STATES PATENTS

| | | | |
|---|---|---|---|
| 155,313 | 9/1874 | Kendall | 137—445 X |
| 2,578,544 | 12/1951 | Harr | 137—625.4 |

FOREIGN PATENTS 1,227,484  4/1960  France.

HENRY T. KLINKSIEK, Primary Examiner

MICHAEL O. STURM, Assistant Examiner

U.S. Cl. X.R.

251—320

PO-1050
(5/69)

UNITED STATES PATENT OFFICE
CERTIFICATE OF CORRECTION

Patent No. 3,460,572          Dated August 12, 1969

Inventor(s) Robert B. Hartman

It is certified that error appears in the above-identified patent and that said Letters Patent are hereby corrected as shown below:

Column 1, line 44, "complementasry" should be --complementary--;
Column 3, line 11, "combintaion" should be --combination--;
Column 3, line 29, "passage" should be --passages--; Column 3, line 36, period (.) should be comma (,); Column 4, line 1, "preferably" should be --preferable--; Column 4, line 14, insert "of" after "one".

SIGNED AND
SEALED
MAY 19 1970

(SEAL)
Attest:

Edward M. Fletcher, Jr.
Attesting Officer

WILLIAM E. SCHUYLER, JR.
Commissioner of Patents